US012763958B2

(12) United States Patent
Pingel Berry et al.

(10) Patent No.: US 12,763,958 B2
(45) Date of Patent: Oct. 13, 2026

(54) NON-FUNGIBLE TOKEN WITH ADAPTABLE DIGITAL FILES

(71) Applicant: BANK OF AMERICA CORPORATION, Charlotte, NC (US)

(72) Inventors: Anna Kristen Pingel Berry, Indian Land, SC (US); Shweta Ambulkar, Plainsboro, NJ (US); Benjamin Daniel Hardman, Harrisburg, NC (US); Angela Ianni, Lincoln, RI (US); Ravi Joshi, Pennington, NJ (US); Olga Kocharyan, Matthews, NC (US); Luqman Sharief, Libertyville, IL (US); Michael Wm. Whitaker, Fort Worth, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 53 days.

(21) Appl. No.: 19/045,629

(22) Filed: Feb. 5, 2025

(65) Prior Publication Data

US 2025/0184144 A1 Jun. 5, 2025

Related U.S. Application Data

(63) Continuation of application No. 18/099,590, filed on Jan. 20, 2023, now Pat. No. 12,294,653.

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 8,321,678 | B2 | 11/2012 | Hofmann et al. |
| 8,689,290 | B2 | 4/2014 | Buer |
| 8,707,029 | B2 | 4/2014 | Brand et al. |
| 8,756,423 | B2 | 6/2014 | Djordjrvic et al. |
| 8,862,872 | B2 | 10/2014 | Vanderveen et al. |
| 8,898,453 | B2 | 11/2014 | Preiss et al. |

(Continued)

*Primary Examiner* — Raqiul A Choudhury
(74) *Attorney, Agent, or Firm* — Moore & Van Allen PLLC; Nicholas C. Russell

(57) ABSTRACT

The invention relates to adaptation/alteration of a digital file referenced to a Non-Fungible Token (NFT) via NFT metadata-defined adaptation rules and criteria, i.e., predefined conditions or events that trigger the occurrence of digital file adaptation. The adapted digital file may be presented to indicate a change in a state associated with a specific type of NFT. The NFT may be an authentication NFT used to verify the identity of a user/users, and the digital file may be presented within computing networks or applications for conveying user authenticity to other users within the computing network or application. The predefined conditions are security events that have a positive/negative impact on the authenticity of the user or group of users. Occurrence of one or more of the predefined security events triggers adaptation and presentation of the adapted digital file indicating an increase/decrease in the level of authenticity associated with the user/users.

19 Claims, 10 Drawing Sheets

(56) References Cited

U.S. PATENT DOCUMENTS

| | | | |
|---|---|---|---|
| 8,913,995 | B2 | 12/2014 | Vanderveen et al. |
| 9,071,963 | B2 | 6/2015 | Khan et al. |
| 9,270,663 | B1 | 2/2016 | Kravitz et al. |
| 9,521,548 | B2 | 12/2016 | Fosmark et al. |
| 9,578,025 | B2 | 2/2017 | Pinski et al. |
| 10,771,263 | B2 | 9/2020 | Smith et al. |
| 10,817,875 | B2 | 10/2020 | Makhotin et al. |
| 11,188,901 | B2 | 11/2021 | Karpenko et al. |
| 11,308,487 | B1 | 4/2022 | Foster et al. |
| 11,757,640 | B2 | 9/2023 | Ferenczi |
| 11,907,939 | B2 | 2/2024 | Cramer |
| 2010/0010932 | A1 | 1/2010 | Law et al. |
| 2014/0189799 | A1 | 7/2014 | Lu |
| 2017/0163629 | A1 | 6/2017 | Law et al. |
| 2019/0043022 | A1 | 2/2019 | Fosmark et al. |
| 2019/0392407 | A1 | 12/2019 | Keskar |
| 2020/0097948 | A1 | 3/2020 | Sheets et al. |
| 2020/0169410 | A1 | 5/2020 | Wainblat et al. |
| 2020/0169425 | A1* | 5/2020 | Hofstee ................. H04L 9/0861 |
| 2021/0409956 | A1 | 12/2021 | Wagner |
| 2022/0222364 | A1 | 7/2022 | Roberts et al. |
| 2022/0300966 | A1 | 9/2022 | Andon et al. |
| 2022/0398340 | A1 | 12/2022 | Jakobsson et al. |
| 2023/0034169 | A1 | 2/2023 | Ferenczi |
| 2023/0034621 | A1 | 2/2023 | Pardo |
| 2023/0086191 | A1 | 3/2023 | Jakobsson |
| 2023/0117430 | A1 | 4/2023 | Quigley et al. |
| 2023/0144857 | A1 | 5/2023 | Khan et al. |
| 2023/0182025 | A1 | 6/2023 | Benedetto et al. |
| 2024/0070305 | A1 | 2/2024 | Jurat et al. |

* cited by examiner

NON-FUNGIBLE TOKEN WITH ADAPTABLE DIGITAL FILES

CROSS-REFERENCE TO RELATED APPLICATION

This application is a continuation application of and claims the benefit of priority to U.S. patent application Ser. No. 18/099,590 filed Jan. 20, 2023, and of the same title; the contents of which are also incorporated herein by reference.

FIELD OF THE INVENTION

The present invention is related to Non-Fungible Tokens (NFTs) and, more specifically, providing for the adaptation/alteration of the digital file from which the NFT was generated, such that presentation of the digital file adaptation indicates to the NFT holder or other users in contact with the NFT holder a change in state.

BACKGROUND

A Non-Fungible Token (NFT) is a unique digital identifier that is immutable (i.e., unable to be changed, copied or subdivided over time). Such immutability is made possible by recording/storing the NFT on a distributed trust computing network, commonly referred to as blockchain network, which is used to certify the authenticity and ownership of the NFT. The "non-fungible" aspect refers to the token referencing uniquely identifiable securities, such as a digital file, include image/photo contents, audio content, video content and/or multimedia content. While the NFT is stored on a distributed ledger of the distributed trust computing network (i.e., so called "on-chain"), the referenced digital file and any metadata associated with the NFT may be stored "off-chain", i.e., within conventional datastores and the like. This means that the digital file is capable of being adaptation/alteration and the metadata can be added to, delete from or otherwise changed. Digital file adaptation may be beneficial in those instances in which the NFT, and more specifically the digital file content referenced in the NFT, is presented to users for purposes of indicating a state.

Therefore, a need exists to develop systems, methods and the like that would provide for adaptation of the digital files referenced in an NFT. The desired systems, methods and the like should rely on NFT metadata-defining digital file adaptation rules and criteria, i.e., predefined conditions or events that trigger the occurrence of digital file adaptation. The adapted digital file may be presented to users to indicate a change in state tied to the NFT.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for adaptation/alteration of the digital file referenced to an underlying Non-Fungible Token. Adaptation/alteration of the digital file occurs via NFT metadata-defined adaptation rules and criteria, i.e., predefined conditions or events that trigger the occurrence of digital file adaptation.

The specifics of the adaptation/alteration of the digital file are tied to the type of digital file. Image/photo content may undergo a change in color, contrast, clarity or the like, audio/song content may undergo a change in volume, clarity, mixing, lyrical content or the like and video/multimedia content may undergo a change in coloring, tint, clarity, order, duration and the like. Further, adaptation/alteration of the digital file may include adding to the content and/or deleting content from the digital file.

The adapted digital file may be presented to users to indicate a change in a state associated with a specific type of NFT. For example, the NFT may be an authentication NFT used to verify the identity of a user or group of users and the digital file may be presented within computing networks or applications as a means of conveying user authenticity to other users within the computing network or application. In such instances, the predefined conditions may be security events that have a positive or negative impact on the authentication of the user or group of users. Occurrence of one or more (e.g., a predefined series) of the predefined conditions triggers a digital file adaptation. In this regard, if the security event has a positive or negative impact on the authenticity of the user/group of users, the digital file adaptation may reflect the positive or negative impact (e.g., change the color or clarity of image content, increase/decrease the volume or tempo of audio content or the like). In this regard, the users presented with the adapted digital file and relying on the digital file as an indication of the user's current authenticity state may choose to further interact, or forbid further interaction, with the user accordingly.

In other embodiments of the invention, the NFT may be associated with an event and, more specifically an event that occurs over a period of time, such as a music festival, a conference/convention or the like. In such instances, the predefined conditions may be designated time periods (e.g., every hour) or the completion of designated segments of the events (i.e., completion of an artist at a musical festival, speaker at a convention or the like). Occurrence of one or more of the predefined conditions triggers a digital file adaptation. For example, an image and/or song/video of an artist currently performing or next to perform, image or a biography or topic of the speaker currently speaking or next to speak or the like.

Since the adaptation criteria, i.e., predefined conditions/events and the rules governing adaptation are stored "off-chain" (i.e., external to the distributed trust computing network on which the NFT is recorded), the adaptation criteria and rules may undergo change (i.e., add, delete, modify or the like) throughout the life of the NFT. In specific embodiments of the invention, the adaptation criteria and rules are dynamically changed through implementation of machine-learning techniques which rely on results of previous NFT adaptations (i.e., the type and/or frequency of occurrence of previous predetermined conditions and the like).

A system for adapting a digital file used to generate a Non-Fungible Token (NFT) defines first embodiments of the invention. The system includes a first computing platform including a first memory and one or more first processing devices in communication with the first memory. The first memory stores an NFT generator, which includes one or more cryptographic NFT-generating algorithms, and is executable by at least one of the one or more first processing devices. The NFT generator is configured to receive (1) a digital file comprising at least one chosen from the group consisting of (i) image content, (ii) audio content, and (iii) video content, (2) NFT adaptation criteria comprising a plurality of predetermined conditions, and (3) NFT adaptation rules based on the plurality of predetermined conditions. In response, the NFT generator is configured to generate/mint a NFT using the digital file as input to the one or more cryptographic NFT-generating algorithms and generate metadata comprising the NFT adaptation criteria and NFT adaptation rules. In response, the NFT generator is configured to communicate (i) the NFT to a distributed trust computing network for on-chain storage within a distributed ledger and (ii) the digital file and the metadata to an off-chain datastore.

The system additionally includes a second computing platform including a second memory and one or more second processing devices in communication with the second memory. The second memory stores a digital file adaptation application that is executable by at least one of the one or more second processing devices. The digital file adaptation application is configured to monitor for occurrence of the plurality of predetermined conditions, and, in response to the monitoring detecting an occurrence of at least one of the predetermined conditions, apply the NFT adaptation rules and adapt the digital file. Subsequently, NFT adaptation application is configured to store the adapted digital file within the datastore.

In specific embodiments of the system, the NFT generator is further defined as an authentication (i.e., identity verification) NFT generator that is configured additionally receive authentication credentials associated with a user or group of users and generate/mint the NFT using the digital file and the authentication credentials as input to the one or more cryptographic NFT-generating algorithms. In such embodiments of the system, the predetermined conditions are conditions or events having an effect on an authenticity of the user or group of users.

In other specific embodiments the system further includes a third computing platform having a third memory and one or more third processing devices in communication with the third memory. The third memory stores a NFT digital file presentation application that is executable by at least one of the one or more third processing devices and configured to present, within a network computing environment or application, the digital file and, in response to adapting the digital file, replace, within the network computing environment or application, presentation of the digital file with presentation of the adapted digital file. In specific related embodiments of the system, the NFT digital file presentation is further configured to present, within a virtual reality computing environment, the digital file in conjunction with a virtual representation of the user or group of users and, in response to adapting the digital file, replace, within the virtual reality computing environment, presentation of the digital file with presentation of the adapted digital file. In embodiments of the system, in which the predetermined conditions are conditions or events having an effect on an authenticity of the user or group of users and the presentation of the adapted digital file provides for other users to perceive an increase or decrease in a level of authenticity of the user or group of users.

In further specific embodiments of the invention, the digital file adaptation application is further configured to adapt the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (iii) altering at least one chosen from the group consisting of coloring, tint, clarity, order and duration of the video content, and (iv) adding image, audio or video content.

In other specific embodiments the system further includes a third computing platform having a third memory and one or more third processing devices in communication with the third memory. The third memory stores an NFT adaptation criteria and rules learning application that is executable by at least one of the one or more third processing devices and configured to implement machine-learning techniques based on previous adaptations of the digital file to learn, over time, modifications to at least one of (i) the NFT adaptation criteria and (ii) the NFT adaptation rules and store the modifications as further metadata within the datastore. In such embodiments of the invention, subsequent digital file adaptations are reflective of the modifications to (i) the NFT adaptation criteria and/or (ii) the NFT adaptation rules.

In additional specific embodiments of the system, the NFT generator is further defined as an event NFT generator and the predetermined conditions are points in time of an associated event or an occurrence of a sub-event within the associated event. In such embodiments of the system, adaptation/alteration to the digital file and presentation of the adapted digital file provides indication of the current state or progress of the associated event.

Moreover, in further embodiments of the system, the datastore, or some other datastore/database, is further configured to store historical data including previous adapted digital files and corresponding one or more predetermined conditions that resulted in each previous adapted digital file.

A computer-implemented method for adapting a digital file used to generate a Non-Fungible Token (NFT) defines second embodiments of the invention. The method is executable by one or more computing processor devices. The method includes receiving (1) a digital file comprising at least one chosen from the group consisting of (i) image content, (ii) audio content, and (iii) video content, (2) NFT adaptation criteria comprising a plurality of predetermined conditions, and (3) NFT adaptation rules based on the plurality of predetermined conditions. In response, the method includes generating (i) a NFT using the digital file as input to the one or more cryptographic NFT-generating algorithms and (ii) metadata comprising the NFT adaptation criteria and NFT adaptation rules. Subsequently, the method includes communicating (i) the NFT to a distributed trust computing network for on-chain storage within a distributed ledger and (ii) the digital file and the metadata to an off-chain datastore. The method further includes monitoring for occurrence of the plurality of predetermined conditions and, in response to the monitoring detecting an occurrence of at least one of the predetermined conditions, applying the NFT adaptation rules and adapting the digital file. In response to adapting the digital file, the method includes storing the adapted digital file within the datastore.

In specific embodiments of the method, receiving further includes receiving (4) authentication credentials associated with a user or group of users. In such embodiments of the method, generating further generating generating the NFT using the digital file and the authentication credentials as input to the one or more cryptographic NFT-generating algorithms. In such embodiments of the method the predetermined conditions are conditions or events having an effect on an authenticity of the user or group of users.

In further specific embodiments the computer-implemented method includes presenting, within a network computing environment, the digital file and, in response to adapting the digital file, replacing, within the network computing environment, presentation of the digital file with presentation of the adapted digital file. For example, in specific embodiments of the invention, the network computing environment is a virtual reality computing environment, such as an augmented reality computing network (e.g., the Metaverse or the like) or the like. In such embodiments of the method, the digital file is presented in conjunction with or as part of a virtual representation (e.g., avatar or the like) of the user or group of users. The presentation of the digital file within the virtual reality computing environment may represent the authenticity of the user or group of users, such that adapting the digital file and presentation of the same indicates to other users within the virtual reality computing environment an increase or decrease in the level of authenticity afforded to the user or group of users.

In still further specific embodiments of the method, adapting the digital file further includes adapting the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (ii) altering at least one chosen from the group consisting of coloring, tint, clarity, order and duration of the video content, and (iv) adding image, audio or video content.

In additional specific embodiments of the method, the NFT is associated with an event and the predetermined conditions are points in time of the event or an occurrence of a sub-event within the event. In such embodiments of the invention the adapted digital file provides for identifying a progress or state of the event.

A computer program product including a non-transitory computer-readable medium defines third embodiments of the invention. The computer-readable medium includes sets of codes. The sets of codes cause one or more computing processing devices to receive (1) a digital file comprising at least one chosen from the group consisting of (i) image content, (ii) audio content, and (iii) video content, (2) NFT adaptation criteria comprising a plurality of predetermined conditions, and (3) NFT adaptation rules based on the plurality of predetermined conditions. In response to receiving (1)-(3), a set of codes cause the one or more computing processing devices to generate (i) a NFT using the digital file as input to the one or more cryptographic NFT-generating algorithms and (ii) metadata comprising the NFT adaptation criteria and NFT adaptation rules. Subsequently, a set of codes cause the one or more computing device processors to communicate (i) the NFT to a distributed trust computing network for on-chain storage within a distributed ledger and (ii) the digital file and the metadata to an off-chain datastore. Sets of codes causes the one or more computing processing devices to monitor for occurrence of the plurality of predetermined conditions and, in response to the monitoring detecting an occurrence of at least one of the predetermined conditions, apply the NFT adaptation rules and adapt the digital file. Subsequently, a set of codes cause the one or more computing processing devices to store the adapted digital file within the datastore.

In specific embodiments of the computer program product, the set of codes for causing one or more computing processing devices to receive further cause the one or more computing processing devices to receive (4) authentication credentials associated with a user or group of users. In such embodiments of the computer program product, the set of codes for causing one or more computing processing devices to generate further cause the one or more computing processing devices to generate the NFT using the digital file and the authentication credentials as input to the one or more cryptographic NFT-generating algorithms. In such embodiments of the computer program product, the predetermined conditions are conditions or events having an effect on an authenticity of the user or group of users.

In still further embodiments of the computer program product, the sets of codes further include sets of codes for causing one or more computing processing devices to present, within a network computing environment or application, the digital file and, in response to adapting the digital file, replace, within the network computing environment or application, presentation of the digital file with presentation of the adapted digital file. In specific related embodiments of the computer program product, the network computing environment is a virtual reality computing environment, such as an augmented reality computing environment (e.g., the Metaverse or the like) or the like. In such embodiments of the invention, the digital file is presented in conjunction with or as part of a virtual representation (e.g., avatar or the like) of the user or group of users.

In further embodiments of the computer program product, the set of codes for causing one or more computing processing devices to adapt the digital file further cause the one or more computing processing devices to adapt the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (iii) altering at least one chosen from the group consisting of coloring, tint, clarity, order and duration of the video content, and (iv) adding image, audio or video content.

Thus, according to embodiments of the invention, which will be discussed in greater detail below, the present invention provides for adaptation/alteration of the digital file referenced to an underlying Non-Fungible Token (NFT). Adaptation/alteration of the digital file occurs via NFT metadata-defined adaptation rules and criteria, i.e., predefined conditions or events that trigger the occurrence of digital file adaptation. The adapted digital file may be presented to users to indicate a change in a state associated with a specific type of NFT. For example, the NFT may be an authentication NFT used to verify the identity of a user or group of users and the digital file may be presented within computing networks or applications as a means of conveying user authenticity to other users within the computing network or application. In such instances, the predefined conditions may be security events that have a positive or negative impact on the authenticity (i.e., verified identity) of the user or group of users. Occurrence of one or more (e.g., a predefined series) of the predefined security events triggers adaptation of the digital file and presentation of the adapted digital file which provides an indication of an increase or decrease in the level of authenticity associated with the user/users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
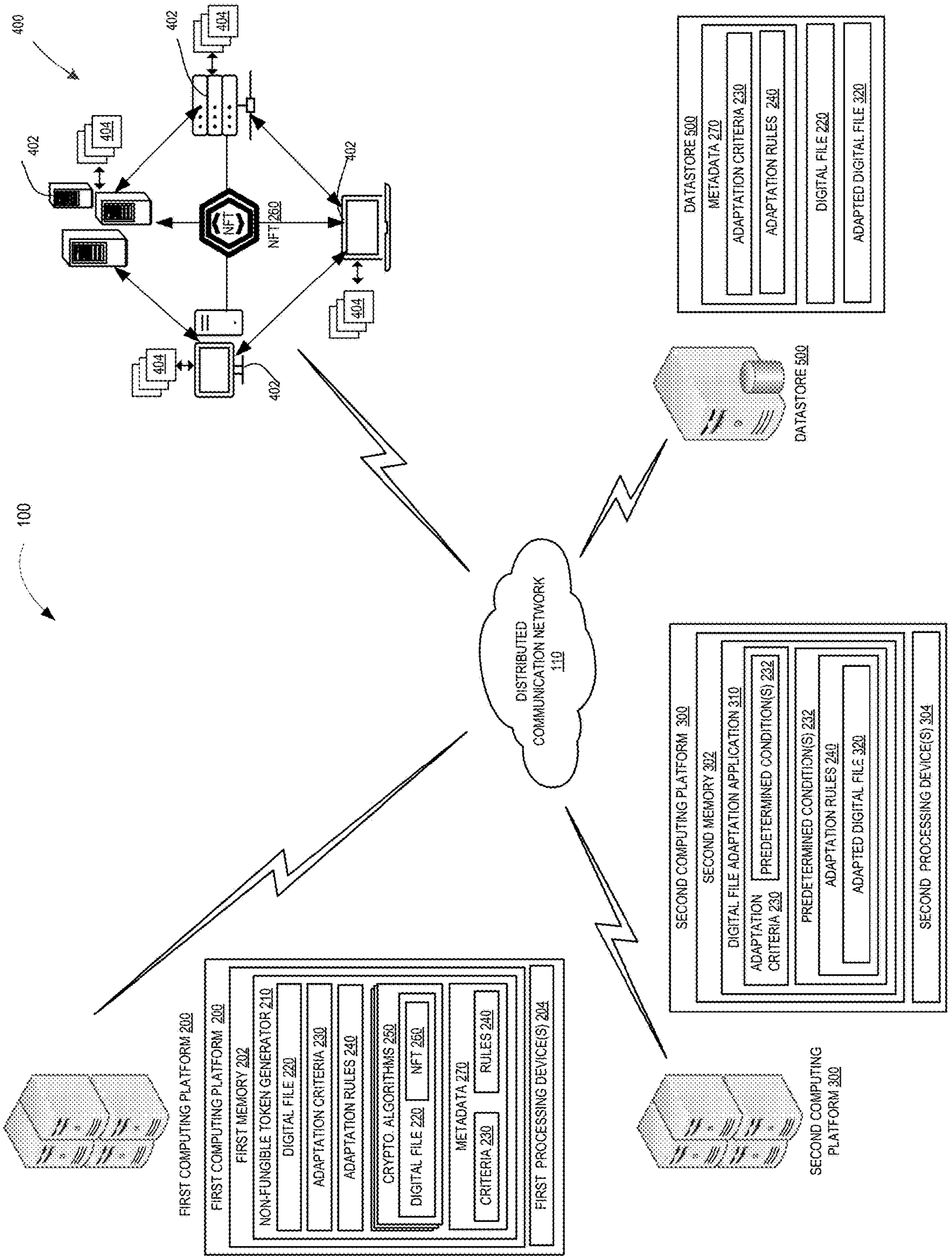
Figure 2:
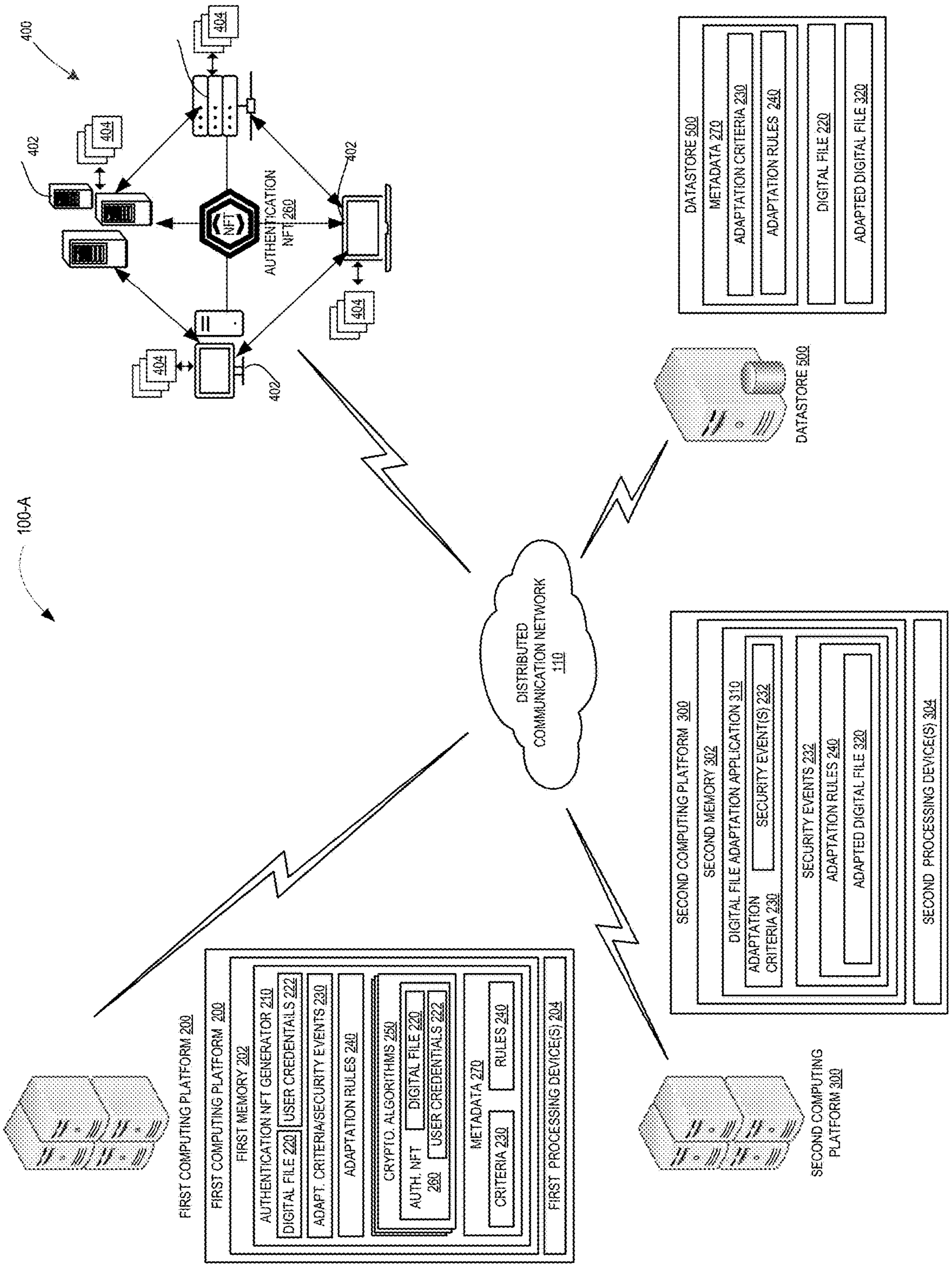
Figure 3:
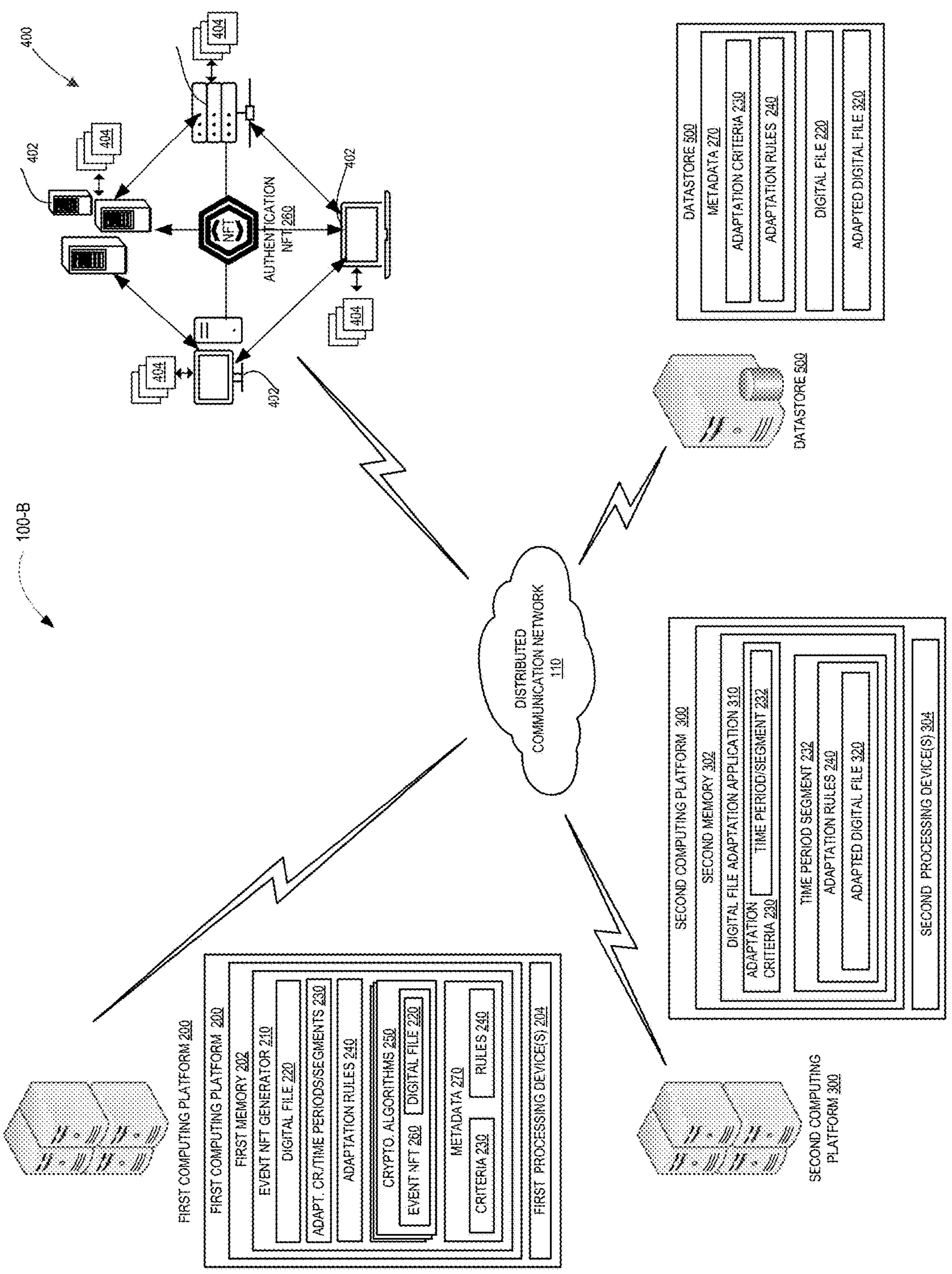
Figure 4:
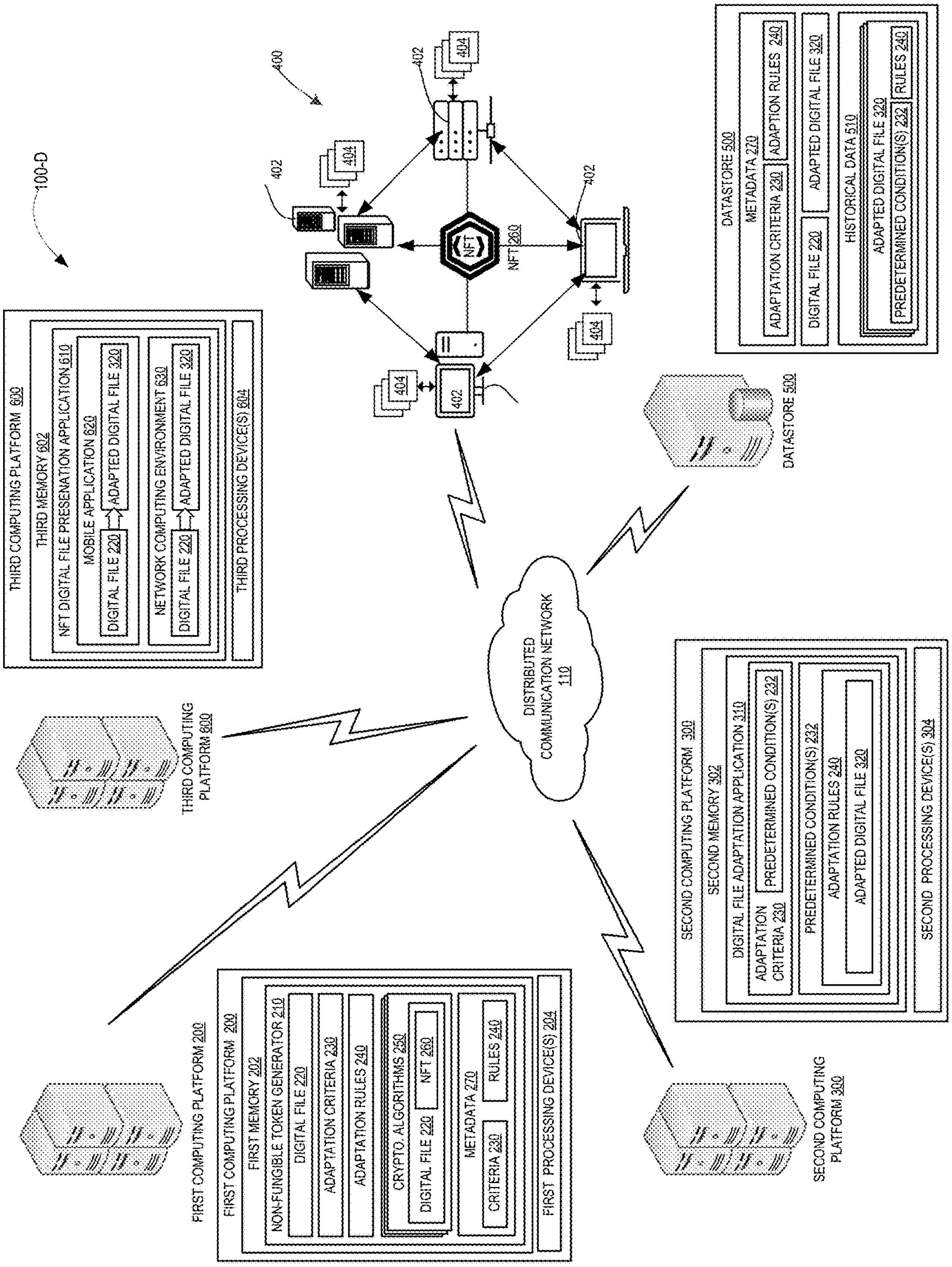
Figure 5:
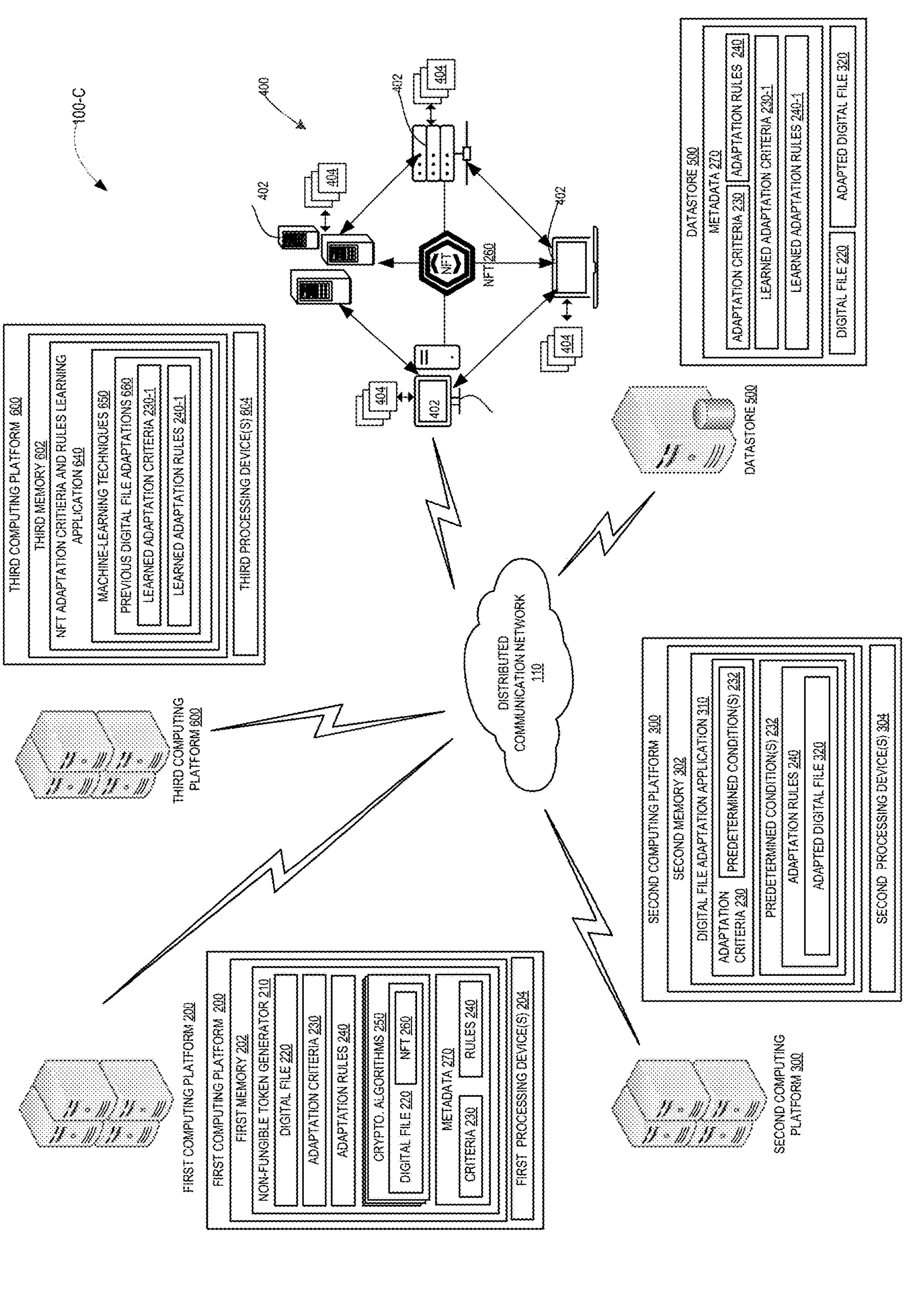
Figure 6:
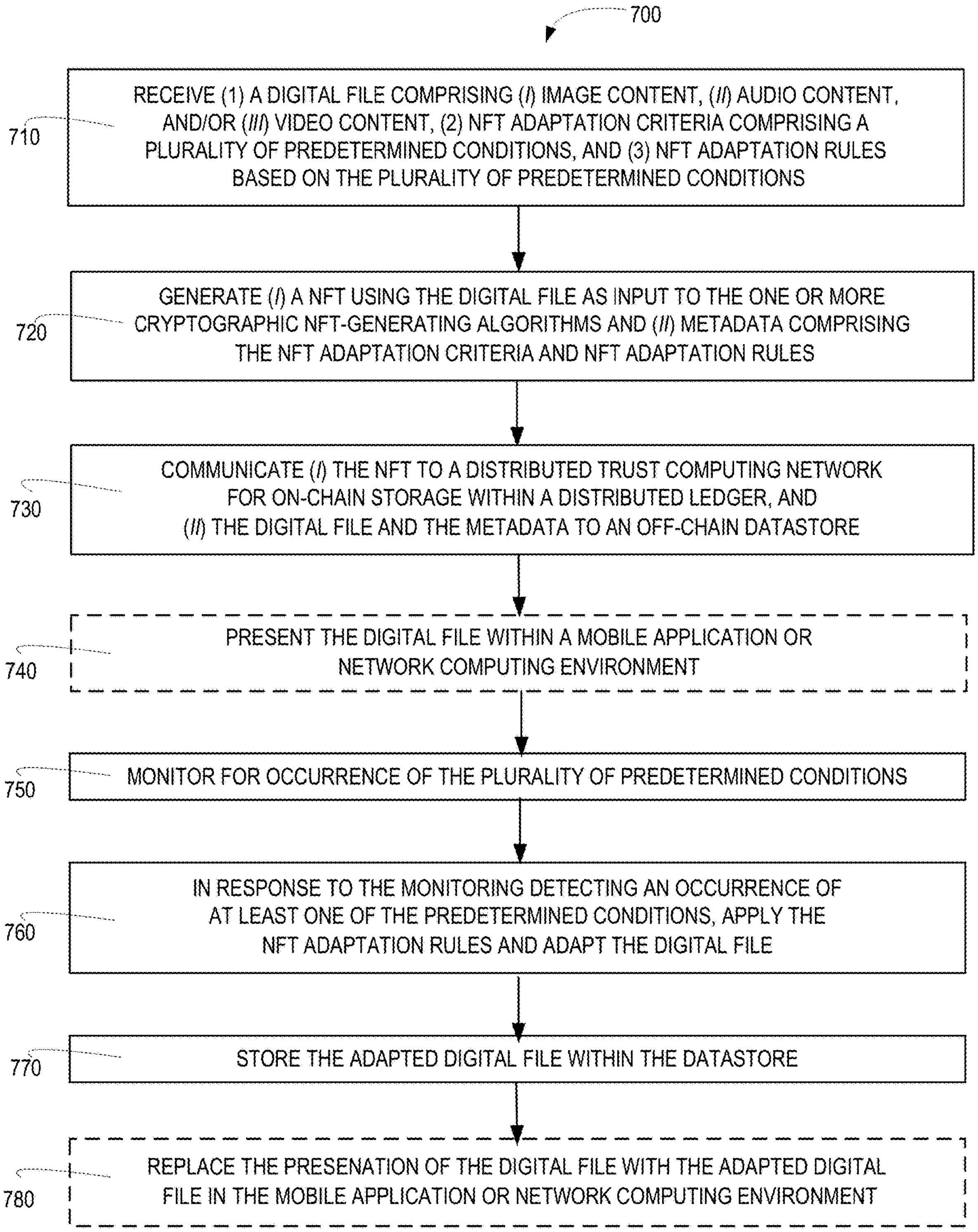
Figure 7:
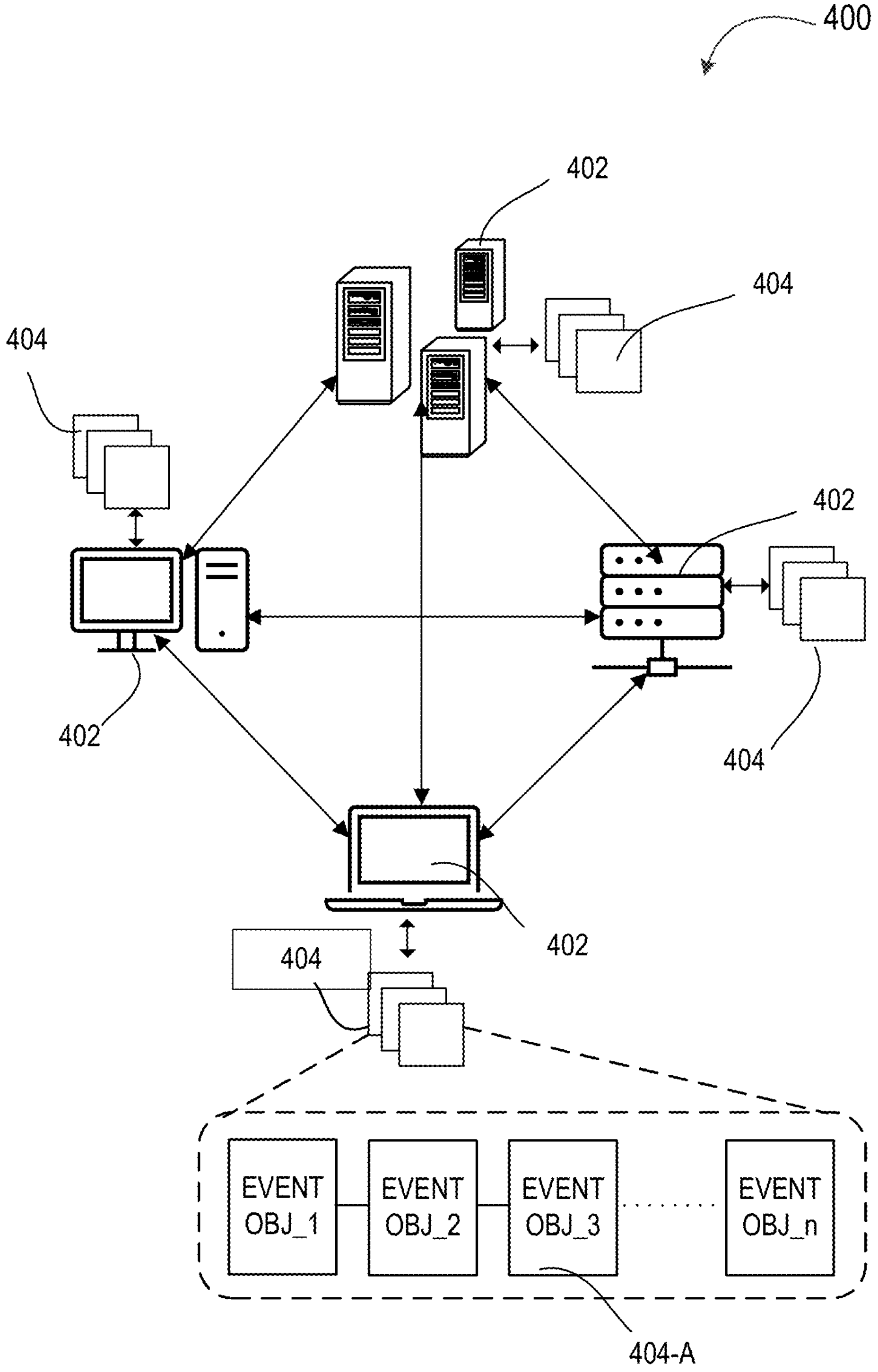
Figure 8:
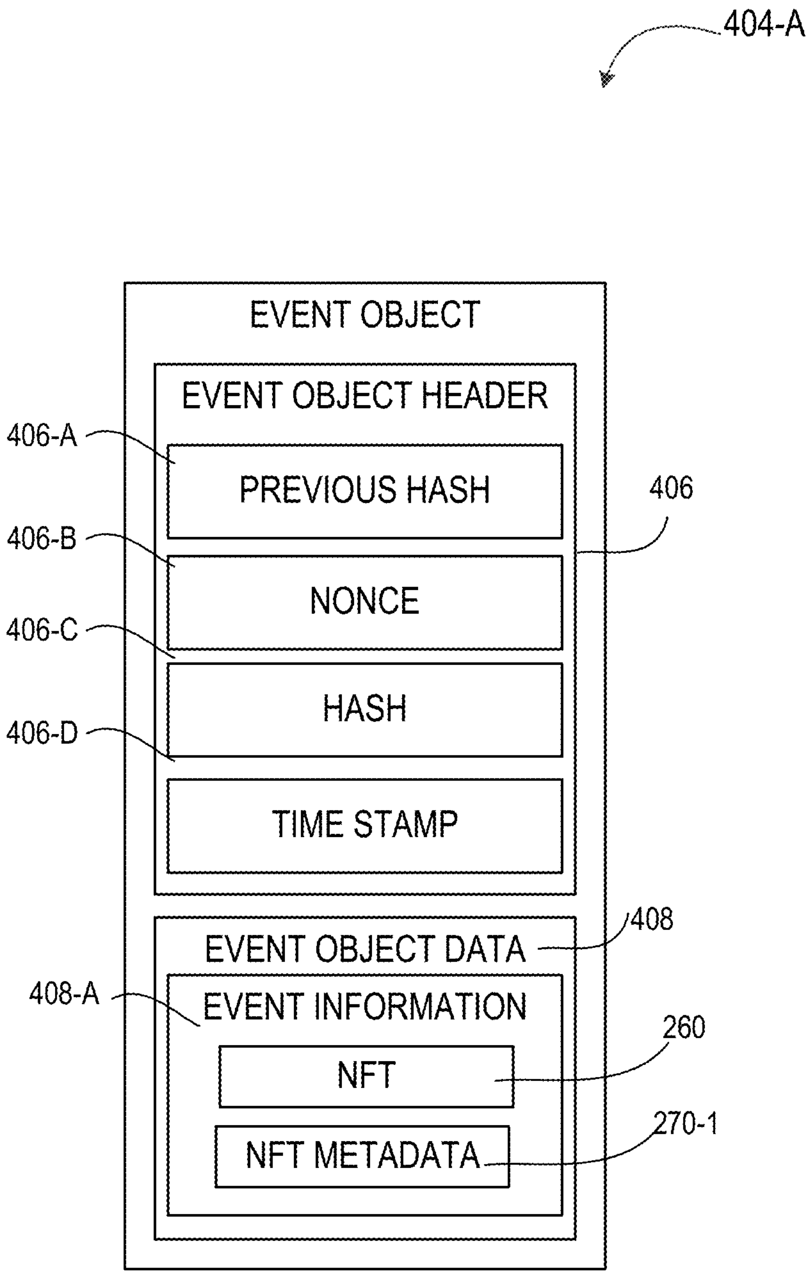
Figure 9:
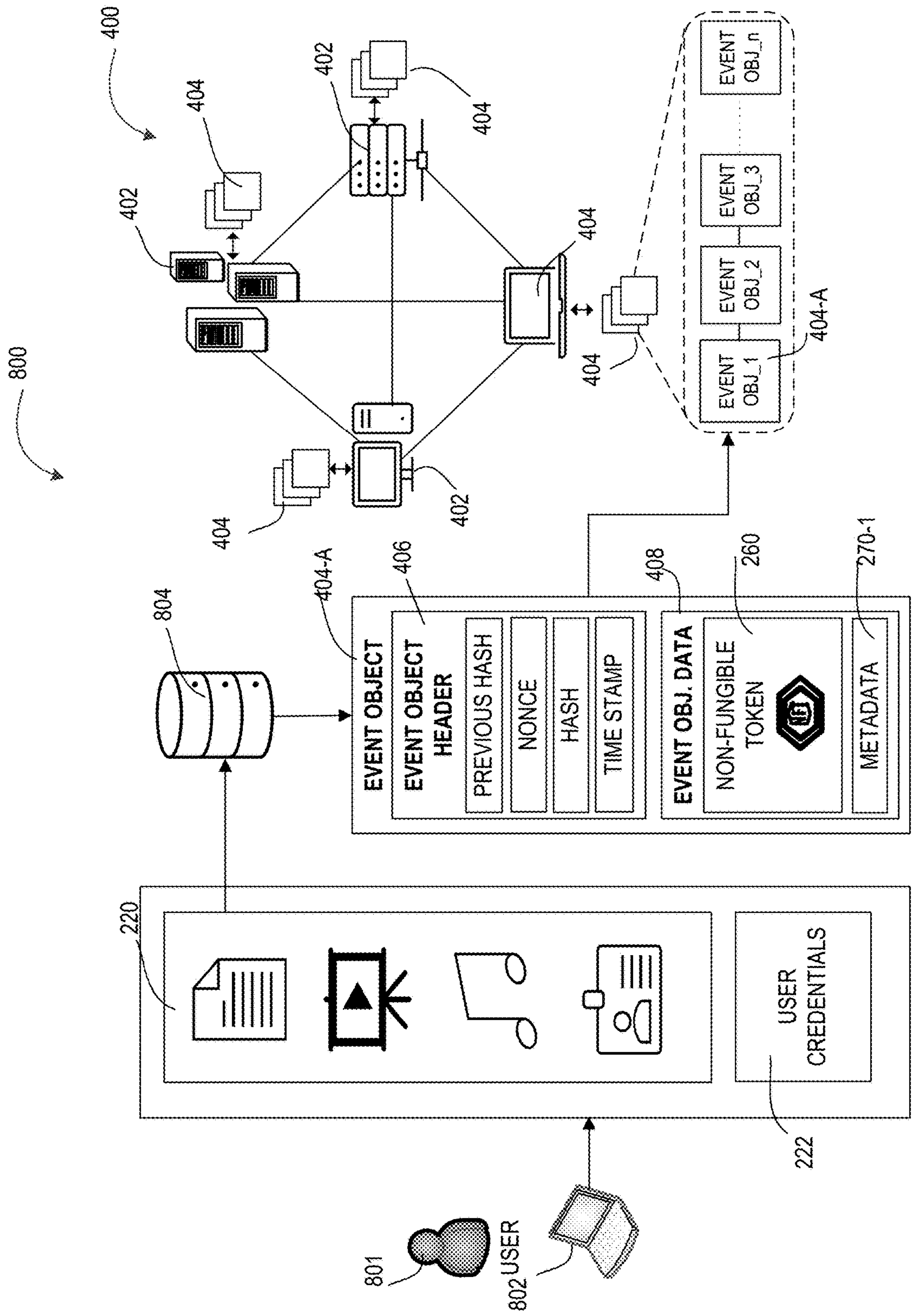
Figure 10:
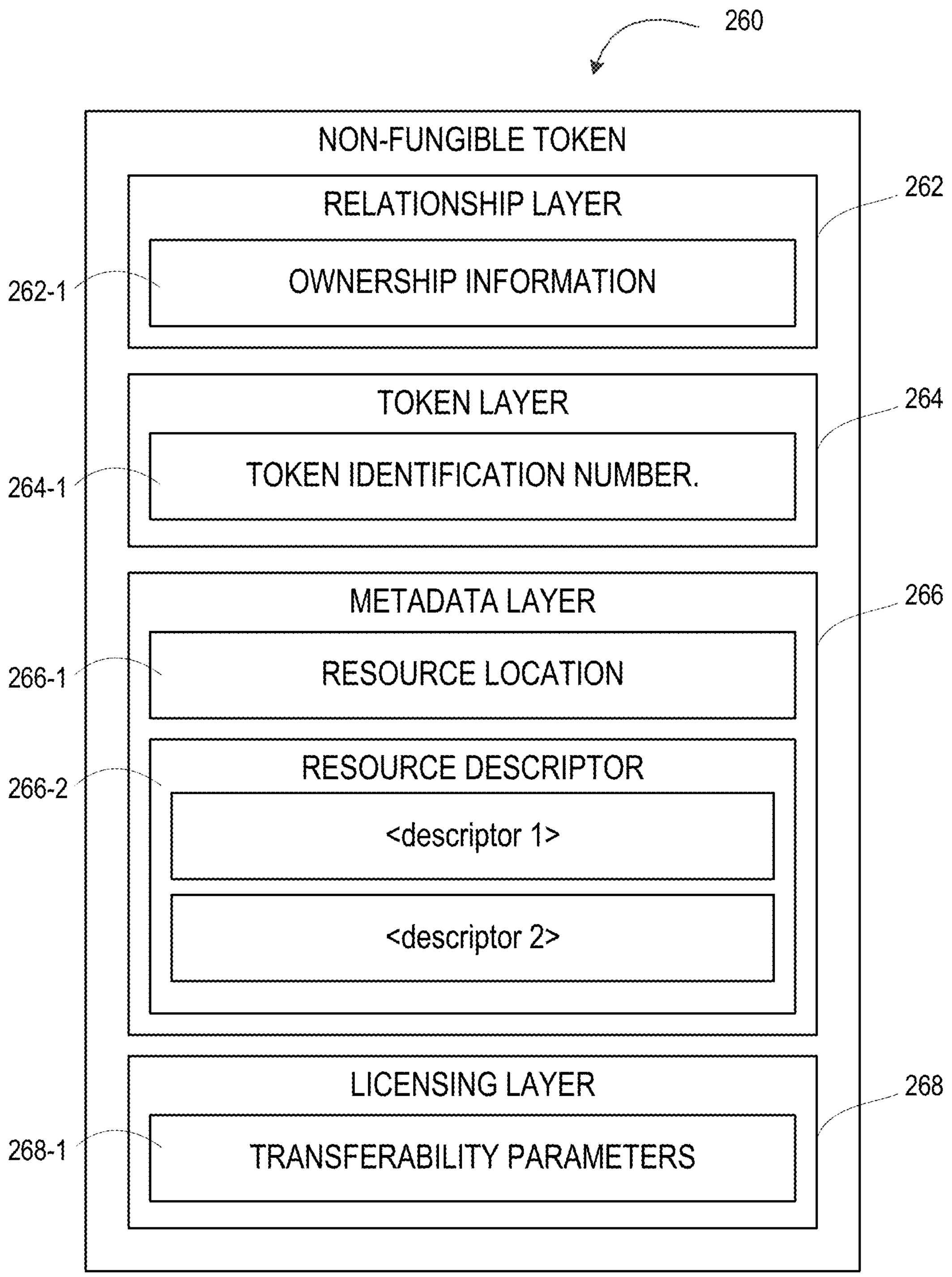

Having thus described embodiments of the disclosure in general terms, reference will now be made to the accompanying drawings, wherein:

FIG. 1 is a schematic/block diagram of a system for adapting a digital file used to generate a Non-Fungible Token (NFT), in accordance with embodiments of the present invention;

FIG. 2 is schematic/block diagram of a system for adapting a digital file used to generate an authentication NFT, such that the digital file adaptation indicates a change in a level of authenticity afforded the user or group of users associated with the authentication NFT, in accordance with embodiments of the present invention;

FIG. 3 is schematic/block diagram of a system for adapting a digital file used to generate an event-related NFT, such that the digital file adaptation indicates a time period or progression of the event associated with the event NFT, in accordance with embodiments of the present invention;

FIG. 4 is a system for adapting a digital file used to generate a Non-Fungible Token (NFT) including presentation of the digital file within a mobile application or network computing environment and replacement therewith with the adapted digital file, in accordance with embodiments of the present;

FIG. 5 is a system for adapting a digital file used to generate a Non-Fungible Token (NFT) including learning adaptation criteria and/or adaptation rules based on at least on previous adaptations, in accordance with embodiments of the present;

FIG. 6 is a flow diagram of a method for adapting a digital file used to generate an NFT, in accordance with embodiments of the present invention;

FIG. 7 is a schematic diagram of a distributed trust computing network, in accordance with embodiments of the present invention;

FIG. 8 is a block diagram of an event object stored within a distributed ledger of a distributed trust computing network, in accordance with some embodiments of the present disclosure;

FIG. 9 is a schematic diagram of system for generating a Non-Fungible Token (NFT) and storing the NFT within a distributed trust computing network, in accordance with embodiments of the present invention; and FIG. 10 is a block diagram of an architecture for an exemplary NFT; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for adaptation/alteration of the digital file referenced to an underlying Non-Fungible Token. Adaptation/alteration of the digital file occurs via NFT metadata-defined adaptation rules and criteria, i.e., predefined conditions or events that trigger the occurrence of digital file adaptation.

The specifics of the adaptation/alteration of the digital file are tied to the type of digital file. Image/photo content may undergo a change in color, contrast, clarity or the like, audio/song content may undergo a change in volume, clarity, mixing, lyrical content or the like and video/multimedia content may undergo a change in coloring, tint, clarity, order, duration and the like. Further, adaptation/alteration of the digital file may include adding to the content and/or deleting content from the digital file.

The adapted digital file may be presented to users to indicate a change in a state associated with a specific type of NFT. For example, the NFT may be an authentication NFT used to verify the identity of a user or group of users and the digital file may be presented within computing networks or applications as a means of conveying user authenticity to other users within the computing network or application. In such instances, the predefined conditions may be security events that have a positive or negative impact on the authentication of the user or group of users. Occurrence of one or more (e.g., a predefined series) of the predefined conditions triggers a digital file adaptation. In this regard, if the security event has a positive or negative impact on the authenticity of the user/group of users, the digital file adaptation may reflect the positive or negative impact (e.g., change the color or clarity of image content, increase/decrease the volume or tempo of audio content or the like). As such, the users presented with the adapted digital file and relying on the digital file as an indication of the user's current authenticity state may choose to further interact with the user, take certain precautions when further interacting with the user (e.g., require further authentication credentials) or forbid further interaction with the user.

In other embodiments of the invention, the NFT may be associated with an event and, more specifically an event that occurs over a period of time, such as a music festival, a conference/convention or the like. In such instances, the predefined conditions may be designated time periods (e.g., every hour) or the completion of designated segments of the events (i.e., completion of an artist's set at a musical festival, a speech at a convention or the like). Occurrence of one or more of the predefined conditions triggers a digital file adaptation. For example, an image and/or song/video of an artist currently performing or next to perform, image or a biography or topic of the speaker currently speaking or next to speak or the like.

Since the adaptation criteria, i.e., predefined conditions/events and the rules governing adaptation are stored "off-chain" (i.e., external to the distributed trust computing network on which the NFT is recorded), the adaptation criteria and rules may undergo change (i.e., add, delete, modify or the like) throughout the life of the NFT. In specific embodiments of the invention, the adaptation criteria and rules are dynamically changed through implementation of machine-learning techniques which rely on results of previous NFT adaptations (i.e., the type and/or frequency of occurrence of previous predetermined conditions and the like) as means for determining which adaptation criteria and/or rules necessitate change.

Referring to FIG. 1, a schematic/block diagram is provided of a system 100 for adapting digital files used to generate Non-Fungible Token(s) (NFTs), in accordance with embodiments of the present invention. The system 100 is executable throughout distributed communications network 110, which may comprise the Internet, one or more intranets, one or more cellular communication networks or the like. The system 100 includes a first computing platform 200 having a first memory 202 and one or more first processing devices 204 in communication with the first memory 202. First memory 202 stores NFT generator 210 that includes one or more cryptographic algorithms 250 and is executable by one or more of the first processing devices 204. NFT generator 210 is configured to receive a digital file 220 that includes image content, audio content and/or video/multimedia content. In addition, NFT generator 210 is configured to receive adaptation criteria 230, such as predetermined conditions/events and adaptation rules 240, which trigger digital file 220 adaptation. NFT generator is further configured to generate (i.e., so called "mint") NFT 260 using the digital file 220 as at least a portion of the input to the one or more cryptographic hash algorithms 250. In addition, NFT generator 250 is configured to generate metadata 270 that includes, but is not limited to, the adaptation criteria 230 and adaptation rules 240.

In response to generating the NFT 260 and associated metadata 270, NFT generator 210 is further configured to communicate NFT 260 to a distributed ledger 404 stored amongst various nodes 402 of a distributed trust computing network 400, which serves to validate the authenticity of the NFT. Storage of the NFT 260 within the distributed ledger is considered to be "on-chain" storage. Further details concerning a distributed trust computing network are discussed in relation to FIG. 7, infra. Moreover, NFT generator 210 is further configured to communicate the metadata 270 comprising the adaptation rules 240 and the adaptation criteria 230, as well as the digital file 220 to datastore 500, which is considered to "off-chain" storage (i.e., separate from the distributed trust computing network 400).

System 100 additionally includes second computing platform 300 having a second memory 302 and one or more second processing devices 304 in communication with the second memory 302. Second memory 302 stores digital file adaptation application 310 that is executable by one or more of the second processing devices 304. Digital file adaptation application is configured to monitor for occurrence (including receiving notification of the occurrence) of the predetermined conditions 232 defined by the adaptation criteria 230. In response to detecting (including receiving notification) of an occurrence of one or more of the predetermined conditions, digital file adaptation application 310 is configured to apply the adaption rules 240 and generate an adapted 320 digital file. In response to generating an adapted digital file, the digital file adaptation application 310 is configured to store the adapted digital file in the datastore 500.

Adaptation of digital file 220 may include any alteration or change to the underlying digital file that is visually or audibly perceptible to a user. The alteration or change should not render the original digital file 220 unrecognizable to the user. For example, alteration/changes to image content (e.g., photographs, illustrations or the like) may include color, clarity, tint/tone, including shading, as well as adding to or subtracting from the image content and the like. Alteration/changes to audio content (e.g., song, voice clip or the like) may include volume, clarity, mixing, lyrical/text content as well as adding to or subtracting from the audio content and the like. Alteration/changes to video/multimedia (e.g., video clip or the like) content may include coloring, clarity, tint/tone, duration, order as well as adding to or subtracting from the video/multimedia content and the like.

In specific embodiments of the system 100, adaptation rules 240 provide for determining if a predetermined condition 232 warrants adaptation of the digital file 220 and, if so, the type or degree of adaptation that is required. In specific embodiments of the system, the adaptation rules 240 may be configured such that detection of specific predetermined conditions 232 trigger digital file adaptation, while in other embodiments of the invention a specific series (i.e., more than one) of the predetermined conditions 232 are required to trigger digital file adaptation. Further, adaptation rules 240 may be configured such that the series of the predetermined conditions 232 are required to occur in a specified order or, in other instances the predetermined conditions 232 may occur in any order conceivable.

Referring to FIG. 2, a schematic/block diagram is provided of a system 100-A for adapting digital files used to generate an authentication NFT, in accordance with embodiments of the present invention. Similar to system 100 shown in FIG. 1, system 100-A includes a first computing platform 200 having a first memory 202 and one or more first processing devices 204 in communication with the first memory 202 and a second computing platform 300 having a second memory 302 and one or more second processing devices 304 in communication with the first memory 202 First/second memory 202, 302 may comprise volatile and non-volatile memory, such as read-only and/or random-access memory (RAM and ROM), EPROM, EEPROM, flash cards, or any memory common to computing platforms). Moreover, first/second memory 302 may comprise cloud storage, such as provided by a cloud storage service and/or a cloud connection service. First/Second processing devices 204, 304 may be application-specific integrated circuits ("ASIC"), or other chipset, logic circuit, or other data processing device(s). First/second processing device(s) 204, 304 may execute one or more application programming interface (APIs) (not shown in FIGS. 1-5) that interface with any resident programs, such as authentication NFT generator 210 or the like, stored in first memory 202 of first computing platform 200 and/or digital file adaptation application 310, stored in second memory 302 of second computing platform 300 and any external programs. First/second processing devices(s) 204, 304 may include various processing subsystems (not shown in FIGS. 1-5) embodied in hardware, firmware, software, and combinations thereof, that enable the functionality of first computing platform 200 and second computing platform 300 and the operability of first computing platform 200 and second computing platform 300 on a distributed communication network 110, such as the Intranet, cellular network(s) and the like. For example, processing subsystems allow for initiating and maintaining communications and exchanging data with other networked devices. For the disclosed aspects, processing subsystems of first computing platform 200 and/or second computing platform 300 may include any subsystem used in conjunction with authentication NFT generator 210, digital file adaptation application 310 and related tools, routines, sub-routines, algorithms, sub-algorithms, sub-modules thereof. In specific embodiments of the system 100-A, first computing platform 200 and/or second computing platform 300 may additionally include a communications module (not shown in FIGS. 1-5) embodied in hardware, firmware, software, and combinations thereof, that enables electronic communications between the first computing platform 200/second computing platform 300 and other networks and network devices, such as distributed trust computing network 400, datastore 500 and the like. Thus, communication module may include the requisite hardware, firmware, software and/or combinations thereof for establishing and maintaining a network communication connection with one or more devices and/or networks.

First memory 202 stores NFT generator 210, which according to system 100-A is authentication NFT generator 210 that is executable by one or more of the first processing devices 204. Authentication NFT generator 210 is configured to receive a digital file 220 that includes image content, audio content and/or video/multimedia content and authentication credentials 222 associated with a user or group of users (such as personal characteristic data, passcodes/words, and the like). In addition, authentication NFT generator 210 is configured to receive adaptation criteria 230, such as predetermined security events and adaptation rules 240, which trigger digital file 220 adaptation. Authentication NFT generator is further configured to generate (i.e., so called "mint") authentication NFT 260 using the digital file 220 and at least a portion of the user credentials 222 as at least a portion of the input to the one or more cryptographic hash algorithms 250. In addition, authentication NFT generator 250 is configured to generate metadata 270 that includes, but is not limited to, the adaptation criteria 230 (i.e., security events 232) and adaptation rules 240.

In accordance with system 100-A, security events 232 may be any event that has a positive or negative effect on the authentication of the underlying user or group of users. For example, the security event may be a financial transaction above a specified amount, a security exchange above a specified amount, financial account balance above/below a specified amount, negative/suspicious activity events (e.g., wire transfers or the like) or the like.

In response to generating the NFT 260 and associated metadata 270, authentication NFT generator 210 is further configured to communicate NFT 260 to a distributed ledger 404 stored amongst various nodes 402 of a distributed trust computing network 400, which serves to validate the authenticity of the NFT. Storage of the NFT 260 within the distributed ledger is considered to be "on-chain" storage. Moreover, authentication NFT generator 210 is further configured to communicate the metadata 270 comprising the adaptation rules 240 and the adaptation criteria 230, as well as the digital file 220 to datastore 500, which is considered to "off-chain" storage (i.e., separate from the distributed trust computing network 400).

System 100 additionally includes second computing platform 300 having a second memory 302 and one or more second processing devices 304 in communication with the second memory 302. Second memory 302 stores digital file adaptation application 310 that is executable by one or more of the second processing devices 304. Digital file adaptation application is configured to monitor for occurrence (including receiving notification of the occurrence) of the security events 232 defined by the adaptation criteria 230. In response to detecting (including receiving notification) of an occurrence of one or more of the security events 232, digital file adaptation application 310 is configured to apply the adaption rules 240 and generate an adapted digital file 320. In response to generating an adapted digital file, the digital file adaptation application 310 is configured to store the adapted digital file in the datastore 500. In accordance with embodiments described in relation to FIG. 2, the adapted digital file 320 is adapted to denote an increase or decrease in the level of authentication (i.e., identity verification) afforded to the user or group of users associated with the authentication NFT 260.

Referring to FIG. 3, a schematic/block diagram is provided of a system 100-B for adapting digital files used to generate an event-related NFT, in accordance with embodiments of the present invention. Similar to system 100 shown in FIG. 1, system 100-B includes a first computing platform 200 having a first memory 202 and one or more first processing devices 204 in communication with the first memory 202 and a second computing platform 300 having a second memory 302 and one or more second processing devices 304 in communication with second memory 304.

First memory 202 stores NFT generator 210, which according to system 100-B is event NFT generator 210 that is executable by one or more of the first processing devices 204. Event NFT generator 210 is configured to receive a digital file 220 that includes image content, audio content and/or video/multimedia content. In addition, event NFT generator 210 is configured to receive adaptation criteria 230, such as predetermined time periods or event segments 232 and adaptation rules 240, which trigger digital file 220 adaptation. Event NFT generator 210 is further configured to generate (i.e., so called "mint") event NFT 260 using the digital file 220 as at least a portion of the input to the one or more cryptographic hash algorithms 250. In addition, event NFT generator 250 is configured to generate metadata 270 that includes, but is not limited to, the adaptation criteria 230 (i.e., time periods or event segments 232) and adaptation rules 240.

In accordance with system 100-B, time periods/event segments 232 may be any specific time period (e.g., an hour) or event segment (e.g., performer, speaker or the like) included in the event. For example, the event segment may be a specific performer at a music festival or a specific speaker at a conference/convention.

In response to generating the NFT 260 and associated metadata 270, event NFT generator 210 is further configured to communicate NFT 260 to a distributed ledger 404 stored amongst various nodes 402 of a distributed trust computing network 400, which serves to validate the authenticity of the NFT. Storage of the NFT 260 within the distributed ledger is considered to be "on-chain" storage. Moreover, NFT generator 210 is further configured to communicate the metadata 270 comprising the adaptation rules 240 and the adaptation criteria 230, as well as the digital file 220 to datastore 500, which is considered to "off-chain" storage (i.e., separate from the distributed trust computing network 400).

System 100 additionally includes second computing platform 300 having a second memory 302 and one or more second processing devices 304 in communication with the second memory 302. Second memory 302 stores digital file adaptation application 310 that is executable by one or more of the second processing devices 304. Digital file adaptation application is configured to monitor for occurrence (including receiving notification of the occurrence) of the time periods/event segments 232 defined by the adaptation criteria 230. In response to detecting (including receiving notification) of an occurrence of one or more of the time periods/event segments 232, digital file adaptation application 310 is configured to apply the adaption rules 240 and generate an adapted digital file 320. In response to generating an adapted digital file, the digital file adaptation application 310 is configured to store the adapted digital file in the datastore 500. In accordance with embodiments described in relation to FIG. 3, the adapted digital file 320 is adapted to denote progress or current duration of the event associated with the event-related NFT 260.

Referring to FIG. 4 a schematic/block diagram is provided of a system 100-C for adapting digital files used to generate an NFT including presentation of the digital file and adapted digital file, in accordance with embodiments of the present invention. The first computing platform 200, second computing platform 300, distributed trust computing network 400 and datastore 500 are the same as those described in relation to FIGS. 1-3 and, for the sake of brevity, are not discussed further in relation to FIG. 4. System 100-C includes third computing platform 600 having third memory 602 and one or more third processing devices 604 in communication with third memory 602. Third memory 602 stores NFT digital file presentation application 610, which is executable by one or more of the third processing devices 604. In specific embodiments of the invention, NFT digital file presentation application 610 is a mobile application 620 or is configured to present the digital file 220 within mobile application 620 and, in response to generating an adapting digital file 320, replacing the digital file 220 with presentation of the adapted digital file. In other embodiments of the invention, NFT digital file presentation application 610 is configured to present the digital file 220 and the adapted digital file 320 within a network computing environment 630, such as virtual reality computing environment which may include an augmented reality computing network, such as the Metaverse or the like. In such embodiments of the invention, in which the digital file 220 is presented in a virtual reality computing environment, the digital file 220 and adapted digital file 320 may be presented as or in conjunction with a virtual representation/indicator of the user (e.g., an avatar or the like).

Referring to FIG. 5 a schematic/block diagram is provided of a system 100-D for adapting digital files used to generate an NFT including learning, over time, digital file adaptation criteria and/or digital file adaptation rules, in accordance with embodiments of the present invention. The first computing platform 200, second computing platform 300, distributed trust computing network 400 and datastore 500 are the same as those described in relation to FIGS. 1-3 and, for the sake of brevity, are not discussed further in relation to FIG. 5. System 100-C includes third computing platform 600 having third memory 602 and one or more third processing devices 604 in communication with third memory 602. Third memory 602 stores NFT digital file adaptation criteria and rules learning application 640, which is executable by one or more of the third processing devices 604. NFT digital file adaptation criteria and rules learning application 640 is configured to implement machine learning techniques 650 to learn, over time, further learned adaptation criteria 230-1 and/or further learned adaptation rules 240-1 based at least on results of previous digital file adaptations 660. Learning of the further learned adaptation criteria 230-1 and/or further learned adaptation rules 240-1 may be further based on other auxiliary data feeds dependent upon the nature/type of digital file adaptation and/or what the digital file adaptation is configured to convey. In response to determining the further learned adaptation criteria 230-1 and/or further learned adaptation rules 240-1, the application 640 is configured to communicate the further learned adaptation criteria 230-1 and/or further learned adaptation rules 240-1 to the datastore 500, at which the further learned adaptation criteria 230-1 and/or further learned adaptation rules 240-1 defines further metadata 270 which is used as criteria and rules for forthcoming digital file adaptation determinations.

Referring to FIG. 6, a flow diagram is presented of a method 700 for adapting and presenting a digital file used to mint a Non-Fungible Token (NFT), in accordance with embodiments of the present invention. At Event 710, a digital file including image content, audio content and/or video/multimedia is received along with NFT digital file adaptation criteria and NFT digital file adaptation rules. The adaptation criteria includes predetermined conditions, such as security events or the like, which based on the rules, trigger digital file adaptation.

At Event 720, an NFT is generated/minted using the digital file as at least a portion of the input to one or more cryptographic NFT-generating hash algorithms. In addition, metadata is defined that includes the NFT digital file adaptation criteria and rules. In response to generation of the NFT and metadata, at Event 730, the NFT is communicated to a distributed trust computing network, at which the NFT, after validation, is stored within a distributed ledger and the metadata in the form of the NFT digital file adaptation criteria and rules is communicated to a data store for off-chain storage.

At optional Event 740, the digital image representing the NFT is presented within a mobile application or within a network computing environment, such as virtual reality computing environment which may include an augmented reality computing network, such as the Metaverse or the like. In such embodiments of the method, in which the digital file is presented in a virtual reality computing environment the digital file may be presented as or in conjunction with a virtual representation/indicator of the user (e.g., an avatar or the like).

At Event 750, the predetermined conditions are monitored for occurrence and, in response to detecting occurrence of at least one of the predetermined conditions, at Event 760, the NFT digital file adaptation rules are applied and, where applicable, the digital file is adapted or otherwise changed/altered. As previously noted, adaptation can be any change/alteration that affects the appearance or sound of the digital file contents without making the original digital file unrecognizable. Moreover, since the predetermined conditions may occur dynamically at any point in time, so too, can the corresponding digital file adaptations. In response to digital file adaptation, at Event 770, the adapted digital file is stored within the datastore and, at optional Event 780, the digital file that is presented in the mobile application or within the network computing environment is replaced with the presentation of the adapted digital file. In specific embodiments of the invention, the adapted digital file will indicate data to the user(s) to which it is presented. For example, if the NFT is an authentication NFT used to verify the identity of a user or group of users, the adapted digital file indicated an increase or decrease in the level of authentication afforded the user or group of users. In another example, if the NFT is an event-related NFT, the adapted digital file indicates a progress of the event (e.g., point-in-time or completion/current state of event segments).

Referring to FIGS. 7 and 8, schematic/block diagram illustrate an exemplary distributed ledger technology (DLT) architecture implemented in a distributed trust computing network (commonly referred to as a "blockchain" network), in accordance with embodiments of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or as is the case in the present invention, a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 7, an exemplary distributed trust computing network 400 includes a distributed ledger 404 being maintained on multiple devices (nodes) 402 that are authorized to keep track of the distributed ledger 404. For example, the nodes 402 may be one or more computing devices such as a comprehensive computing system and one or more client device(s). Each node 402 in the distributed trust computing network 400 may have a complete or partial copy of the entire distributed ledger 404 or set of events and/or event objects 404-A on the distributed ledger 404. Events are initiated at a node and communicated to the various nodes in the distributed trust computing network 400. Any of the nodes 402 can validate an event, record the event to its copy of the distributed ledger 404, and/or broadcast the event, the validation of the event (in the form of an event object) and/or other data to other nodes 402.

FIG. 8 depicts an exemplary event object 404-A. In embodiments of the present invention the event is generation of an NFT and the event object may store the NFT 240 and/or metadata 242 associated with the NFT 240. Event object 404-A includes an event header 406 and an event object data 408. The event header 406 may include a cryptographic hash of the previous event object 406-A; a nonce 406-B, i.e., a randomly generated 32-bit whole number; a cryptographic hash of the current event object 406-C wedded to the nonce 406-B; and a time stamp 406-D. The event object data 408 may include event information 408-A being recorded, such as NFT 240. Once the event object 404-A is generated, the event information 408-A is considered signed and forever tied to its nonce 406-B and hash 406-C. Once generated, the event object 404-A is then deployed on the distributed ledger 404. At this time, a distributed ledger address is generated for the event object 404-A, i.e., an indication of where the event object is located on the distributed ledger 404 and captured for recording purposes. Once deployed, the event information 408-A is considered recorded in the distributed ledger 404.

FIG. 9 illustrates an exemplary process of generating a secure token, such as a Non-Fungible Token (NFT) 240, in accordance with embodiments of the invention. One of ordinary skill in the art will readily appreciate that an NFT is a cryptographic record (referred to as a "token") that is linked to resources, such as user credentials, digital objects or the like. Authentication NFT 240 may be stored on a distributed ledger 404 of a distributed trust computing network 100. However, according to embodiments of the invention, authentication NFT 240 may be stored external from the distributed trust computing network, such as at a network location or at a user's device. In such embodiments of the invention, in which authentication NFT 240 is stored external from the distributed trust computing network, metadata 242 associated with authentication NFT 240 is stored on the distributed ledger 404. The storage of the NFT on the distributed ledger 404 or the storage of the metadata 242 means that various nodes 402 of the distributed trust computing network 400 have reached a consensus as to the ownership and validity/authenticity of authentication NFT 240, i.e., the linked data.

As shown in FIG. 9, to generate, otherwise referred to as "minting" authentication NFT 240, a user (e.g., NFT owner) may identify, using a user input device 202, resources 250 that the user wishes to mint as an NFT. Typically, the resources 250 used to generate the NFTs are digital objects that represent both tangible and intangible objects. These resources 250 may include a piece of art, music, collectible, virtual world items, videos, real-world items such as artwork and real estate, or any other presumed valuable object. According to embodiments of the present invention user credentials 220 (not shown in FIG. 9) are either part of the resources or also used to generate the authentication NFT 240. These resources 250 and user credentials 220 are then digitized into a proper format to generate the NFT 206. Authentication NFT 240 may be a multi-layered documentation that identifies the resources 250 and user credentials 220 but also evidences various event conditions associated therewith.

To record authentication NFT 240 and/or authentication NFT metadata 242 in a distributed ledger 404, an event object 404-A for the authentication NFT 240 is created using data stored in database 804. As previously discussed in relation to FIG. 8, the event object 404-A includes an event object header 406 and an event object data 408. The event object header 406 includes a cryptographic hash of the previous event object, a nonce (i.e., a random 32-bit whole number generated when the event object is created), a cryptographic hash of the current event object wedded to the nonce, and a time stamp. The event object data 408 includes the authentication NFT 240 and/or metadata 242 being recorded. Once the event object 404-A is generated, authentication NFT 240 is considered signed and persistently tied to its corresponding nonce and hash. The event object 404-A is then deployed in the distributed ledger 404. At this time, a distributed ledger address is generated for the event object 404-A, i.e., an indication of where authentication NFT 240 is located on the distributed ledger 404 and captured for recording purposes. Once deployed, authentication NFT 240 is linked permanently to the corresponding hash and the distributed ledger 404, and is considered recorded in the distributed ledger 404, thus concluding the generation/minting process.

As shown in FIG. 9 and previously discussed in relation to FIG. 7, the distributed ledger 404 may be maintained on multiple devices (nodes) 402 of the distributed trust computing network 400; the multiple nodes 402 are authorized to keep track of the distributed ledger 404. For example, the multiple nodes 404 may be computing devices such as a computing system or end-point device(s). Each node 402 may have a complete or partial copy of the entire distributed ledger 404 or set of events and/or event objects on the distributed ledger 404. Events, such as the recordation of authentication NFT 240, are initiated at a node 402 and communicated to the various nodes 402. Any of the nodes 402 can validate an event, record the event to the corresponding copy of the distributed ledger 404, and/or broadcast the event, its validation (in the form of an event object 404-A) and/or other data to other nodes 402.

FIG. 10 illustrates an exemplary authentication NFT 240 as a multi-layered documentation of a resource 250, in accordance with an embodiment of an invention. As shown in FIG. 10, the NFT 240 may include at least relationship layer 242, a token layer 244, a metadata layer 246, and, when applicable, a licensing layer 248. The relationship layer 242 may include ownership information 242-1, including a map of various users that are associated with the resource and/or the NFT 240, and their relationship to one another. For example, if the NFT 240 is acquired by user U1 from a user U2, the relationship between U1 and U2 is recorded in the relationship layer 242. In another example, if the NFT 240 is owned by O1 and the resource itself is stored in a storage facility by storage provider SP1, then the relationship between O1 and SP1 as owner-file storage provider is recorded in the relationship layer 242. The token layer 244 may include a token identification number 244-1 that is used to identify the NFT 206. The metadata layer 246 may include at least a resource location 246-1 and a resource descriptor 246-2. The resource location 246-1 provides information associated with the specific location of the resource 250. Depending on the conditions listed in the smart contract underlying the distributed ledger 404, the resource 250 may be stored on-chain, i.e., directly on the distributed ledger 404 along with the NFT 240, or off-chain, i.e., in an external storage location. The resource location 246-1 identifies where the resource 250 is stored. The resource descriptor 246-2 includes specific information associated with the resource itself. For example, the resource descriptor 246-2 may include information about the supply, authenticity, lineage, provenance of the resource 250. The licensing layer 248 may include any transferability parameters 248-1 associated with the NFT 240, such as restrictions and licensing rules associated with purchase, sale, and any other types of transfer of the resource 250 and/or the NFT 240 from one person to another. Those skilled in the art will appreciate that various additional layers and combinations of layers can be configured as needed without departing from the scope and spirit of the invention.

Thus, present embodiments of the invention adaptation/alteration of the digital file referenced to an underlying Non-Fungible Token (NFT). Adaptation/alteration of the digital file occurs via NFT metadata-defined adaptation rules and criteria, i.e., predefined conditions or events that trigger the occurrence of digital file adaptation. The adapted digital file may be presented to users to indicate a change in a state associated with a specific type of NFT. For example, the NFT may be an authentication NFT used to verify the identity of a user or group of users and the digital file may be presented within computing networks or applications as a means of conveying user authenticity to other users within the computing network or application. In such instances, the predefined conditions may be security events that have a positive or negative impact on the authenticity of the user or group of users. Occurrence of one or more (e.g., a predefined series) of the predefined security events triggers adaptation of the digital file and presentation of the adapted digital file which provides an indication of an increase or decrease in the level of authenticity associated with the user/users.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for adapting a digital file used to generate a Non-Fungible Token (NFT), the system comprising:

a first computing platform including a first memory and one or more first processing devices in communication with the first memory, wherein the first memory stores an NFT generator defined as an event NFT generator, which includes one or more cryptographic NFT-generating algorithms, is executable by at least one of the one or more first processing devices and configured to cause the at least one first processing device to:

receive (1) a digital file comprising at least one chosen from the group consisting of (i) image content, (ii) audio content, and (iii) video content, (2) NFT adaptation criteria comprising a plurality of predetermined conditions that are points in time of an associated event or an occurrence of a sub-event within the associated event, and (3) NFT adaptation rules based on the plurality of predetermined conditions, wherein the adapted digital file provides for identifying a progress or current state of the associated event;

generate (i) a NFT using the digital file as input to the one or more cryptographic NFT-generating algorithms and (ii) metadata comprising the NFT adaptation criteria and NFT adaptation rules; and communicate (i) the NFT to a distributed trust computing network for on-chain storage within a distributed ledger and (ii) the digital file and the metadata to an off-chain datastore; and a second computing platform including a second memory and one or more second processing devices in communication with the second memory, wherein the second memory stores a digital file adaptation application that is executable by at least one of the one or more second processing devices and configured to cause the at least one second processing device to:

monitor for occurrence of the plurality of predetermined conditions;

in response to the monitoring detecting an occurrence of at least one of the predetermined conditions, apply the NFT adaptation rules and adapt the digital file; and store the adapted digital file within the datastore.

2. The system of claim 1, wherein the NFT generator is further defined as an authentication NFT generator that is configured to cause the at least one first processing device to:

receive (4) authentication credentials associated with a user or group of users; and generate the NFT using the digital file and the authentication credentials as input to the one or more cryptographic NFT-generating algorithms, wherein the predetermined conditions are conditions or events having an effect on an authenticity of the user or group of users.

3. The system of claim 1, further comprising a third computing platform including a third memory and one or more third processing devices in communication with the third memory, wherein the third memory stores a NFT digital file presentation application that is executable by at least one of the one or more third processing devices and configured to cause the at least one third processing device to:

present, within a network computing environment, the digital file; and in response to adapting the digital file, replace, within the network computing environment, presentation of the digital file with presentation of the adapted digital file.

4. The system of claim 3, wherein the NFT digital file presentation is further configured to cause the at least one third processing device to:

present, within a virtual reality computing environment, the digital file in conjunction with a virtual representation of the user or group of users; and in response to adapting the digital file, replace, within the virtual reality computing environment, presentation of the digital file with presentation of the adapted digital file.

5. The system of claim 4, wherein the NFT generator is further defined as an authentication NFT generator that is configured to cause the at least one third processing device to:

receive (4) authentication credentials associated with a user or group of users; and generate the NFT using the digital file and the authentication credentials as input to the one or more cryptographic NFT-generating algorithms, wherein the predetermined conditions are conditions or events having an effect on an authenticity of the user or group of users and presentation of the adapted digital file provides for other users to perceive an increase or decrease in a level of authenticity of the user or group of users.

6. The system of claim 1, wherein the digital file adaptation application is further configured to cause the at least one second processing device to:

adapt the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (iii) altering at least one chosen from the group consisting of coloring, tint, clarity, order and duration of the video content, and (iv) adding image, audio or video content.

7. The system of claim 1, further comprising a third computing platform including a third memory and one or more third processing devices in communication with the third memory, wherein the third memory stores an NFT adaptation criteria and rules learning application that is executable by at least one of the one or more third processing devices and configured to cause the at least one third processing device to:

implement machine-learning techniques based on previous adaptations of the digital file to learn modifications to at least one of (i) the NFT adaptation criteria and (ii) the NFT adaptation rules; and store the modifications as further metadata within the datastore.

8. The system of claim 1, wherein the datastore is further configured to store historical data including previous adapted digital files and corresponding one or more predetermined conditions that resulted in each previous adapted digital file.

9. A computer-implemented method for adapting a digital file used to generate a Non-Fungible Token (NFT), the method is executable by one or more computing processor devices and comprising:

receiving (1) a digital file comprising at least one chosen from the group consisting of (i) image content, (ii) audio content, and (iii) video content, (2) NFT adaptation criteria comprising a plurality of predetermined conditions that are points in time of an associated event or an occurrence of a sub-event within the associated event, and (3) NFT adaptation rules based on the plurality of predetermined conditions, wherein the adapted digital file provides for identifying a progress or current state of the associated event;

generating (i) a NFT using the digital file as input to the one or more cryptographic NFT-generating algorithms and (ii) metadata comprising the NFT adaptation criteria and NFT adaptation rules;

communicating (i) the NFT to a distributed trust computing network for on-chain storage within a distributed ledger and (ii) the digital file and the metadata to an off-chain datastore;

monitoring for occurrence of the plurality of predetermined conditions;

in response to the monitoring detecting an occurrence of at least one of the predetermined conditions, applying the NFT adaptation rules and adapting the digital file; and storing the adapted digital file within the datastore.

10. The computer-implemented method of claim 9, wherein receiving further comprises receiving (4) authentication credentials associated with a user or group of users, wherein generating further comprises generating the NFT using the digital file and the authentication credentials as input to the one or more cryptographic NFT-generating algorithms, and wherein the predetermined conditions are conditions or events having an effect on an authenticity of the user or group of users.

11. The computer-implemented method of claim 9, further comprising:

presenting, within a network computing environment, the digital file; and in response to adapting the digital file, replacing, within the network computing environment, presentation of the digital file with presentation of the adapted digital file.

12. The computer-implemented method of claim 11, wherein presenting further comprises presenting, within a virtual reality computing environment, the digital file in conjunction with a virtual representation of the user or group of users, and wherein replacing further comprises replacing, within the virtual reality computing environment, presentation of the digital file with presentation of the adapted digital file.

13. The computer-implemented method of claim 9, wherein adapting the digital file further comprises adapting the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (iii) altering at least one chosen from the group consisting of coloring, tint, clarity, order and duration of the video content, and (iv) adding image, audio or video content.

14. The computer-implemented method of claim 9, wherein the NFT is associated with an event and the predetermined conditions are points in time of the event or an occurrence of a sub-event within the event and wherein the adapted digital file provides for identifying a progress or current state of the event.

15. A computer program product comprising:

a non-transitory computer-readable medium comprising sets of codes for causing one or more computing processing devices to:

receive (1) a digital file comprising at least one chosen from the group consisting of (i) image content, (ii) audio content, and (iii) video content, (2) NFT adaptation criteria comprising a plurality of predetermined conditions that are points in time of an associated event or an occurrence of a sub-event within the associated event, and (3) NFT adaptation rules based on the plurality of predetermined conditions, wherein the adapted digital file provides for identifying a progress or current state of the associated event;

generate (i) a NFT using the digital file as input to the one or more cryptographic NFT-generating algorithms and (ii) metadata comprising the NFT adaptation criteria and NFT adaptation rules;

communicate (i) the NFT to a distributed trust computing network for on-chain storage within a distributed ledger and (ii) the digital file and the metadata to an off-chain datastore;

monitor for occurrence of the plurality of predetermined conditions;

in response to the monitoring detecting an occurrence of at least one of the predetermined conditions, apply the NFT adaptation rules and adapt the digital file; and store the adapted digital file within the datastore.

16. The computer program product of claim 15, wherein the set of codes for causing one or more computing processing devices to receive further cause the one or more computing processing devices to receive (4) authentication credentials associated with a user or group of users, wherein the set of codes for causing one or more computing processing devices to generate further cause the one or more computing processing devices to generate the NFT using the digital file and the authentication credentials as input to the one or more cryptographic NFT-generating algorithms, and wherein the predetermined conditions are conditions or events having an effect on an authenticity of the user or group of users.

17. The computer program product of claim 15, wherein the sets of codes further comprise set of codes for causing one or more computing processing devices to:

present, within a network computing environment, the digital file; and in response to adapting the digital file, replace, within the network computing environment, presentation of the digital file with presentation of the adapted digital file.

18. The computer program product of claim 17, wherein the set of codes for causing one or more computing processing devices to present further cause the one or more computing processing devices to present, within a virtual reality computing environment, the digital file in conjunction with a virtual representation of the user or group of users, and wherein replacing further comprises replacing, within the virtual reality computing environment, presentation of the digital file with presentation of the adapted digital file.

19. The computer program product method of claim 15, wherein the set of codes for causing one or more computing processing devices to adapt the digital file further cause the one or more computing processing devices to adapt the digital file by, at least one chosen from the group consisting of, (i) altering at least one chosen from the group consisting of color, tint, clarity and shading of the image content, (ii) altering at least one chosen from the group consisting of volume, clarity, mixing and lyrical content of the audio content, (iii) altering at least one chosen from the group consisting of coloring, tint, clarity, order and duration of the video content, and (iv) adding image, audio or video content.

* * * * *